(12) United States Patent
Briscoe et al.

(10) Patent No.: US 10,143,139 B2
(45) Date of Patent: Dec. 4, 2018

(54) FIREFIGHTER BALE DESPOOLER

(71) Applicants: Coleman Briscoe, Edmond, OK (US);
Dawson Wiseman, Edmond, OK (US);
Zachary Yap, Oklahoma City, OK (US)

(72) Inventors: Coleman Briscoe, Edmond, OK (US);
Dawson Wiseman, Edmond, OK (US);
Zachary Yap, Oklahoma City, OK (US)

( * ) Notice: Subject to any disclaimer, the term of this patent is extended or adjusted under 35 U.S.C. 154(b) by 0 days.

(21) Appl. No.: 15/731,176

(22) Filed: Apr. 29, 2017

(65) Prior Publication Data

US 2018/0310480 A1   Nov. 1, 2018

(51) Int. Cl.
*A01D 87/12* (2006.01)
*A62C 3/04* (2006.01)
*A62C 27/00* (2006.01)

(52) U.S. Cl.
CPC .............. *A01D 87/127* (2013.01); *A62C 3/04* (2013.01); *A01D 2087/128* (2013.01); *A62C 27/00* (2013.01)

(58) Field of Classification Search
CPC .. A01D 87/127; A01D 2087/128; A62C 3/04; A62C 27/00
USPC ................................. 414/24.5, 24.6
See application file for complete search history.

(56) References Cited

U.S. PATENT DOCUMENTS

| | | | | |
|---|---|---|---|---|
| 2,812,864 | A * | 11/1957 | Martell | A01D 87/127 414/24.6 |
| 3,022,902 | A * | 2/1962 | Bartels | A01D 84/00 414/24.6 |
| 3,586,188 | A * | 6/1971 | Cambell | B60R 9/06 414/462 |
| 3,997,069 | A | 12/1976 | McCanse | |
| 4,044,963 | A | 8/1977 | Hostetler | |
| 4,049,140 | A * | 9/1977 | Roose | A01D 87/127 242/557 |
| 4,248,561 | A | 2/1981 | Graves | |
| 4,514,127 | A | 4/1985 | Maier | |
| 4,518,299 | A | 5/1985 | Vaderlei | |
| 4,538,948 | A | 9/1985 | Melton | |
| 4,648,769 | A * | 3/1987 | Stirling | B66F 9/145 242/557 |
| 4,886,409 | A | 12/1989 | Penner | |
| 5,067,870 | A | 11/1991 | Staffanson | |
| 5,316,427 | A | 5/1994 | Delong | |
| 5,603,597 | A * | 2/1997 | Clay, Sr. | A01D 87/127 224/521 |

* cited by examiner

*Primary Examiner* — Lynn E Schwenning
(74) *Attorney, Agent, or Firm* — Randal D. Homburg

(57) ABSTRACT

A round hay bale unrolling device attaches to a flatbed vehicle presenting a foldable arm attaching to a square hitch receiver of the vehicle supported by the flatbed of the truck allowing the vehicle operator to turn right into the bale to drive an angular spike into the center of the bale, drive forward to despool the round bale and to turn left to disengage the bale in the event of an emergency or at the time the bale has been laid into flat hay. This device is designed to be used by a firefighting vehicle to despool inflamed hay bales without exposing the user to the heat and flames of the hay bale or for use by farmers to unroll the hay bale for feeding without exiting the vehicle in poor weather.

4 Claims, 3 Drawing Sheets

FIREFIGHTER BALE DESPOOLER

CROSS REFERENCE TO RELATED APPLICATIONS

None.

I. BACKGROUND OF THE INVENTION

1. Field of Invention

A round hay bale despooling device attaches to a flatbed vehicle presenting a foldable arm attaching to a square hitch receiver of the vehicle supported by the flatbed of the truck allowing the vehicle operator to turn right into the bale to drive an angular spike into the center of the bale, drive forward to despool the round bale and to turn left to disengage the bale in the event of an emergency or at the time the bale has been laid into flat hay. This device is designed to be used by a firefighting vehicle to despool inflamed hay bales without exposing the user to the heat and flames of the hay bale or for use by farmers to unroll the hay bale for feeding without exiting the vehicle in poor weather.

2. Description of Prior Art

A preliminary review of prior art patents was conducted by the applicant which reveal prior art patents in a similar field or having similar use. However, the prior art inventions do not disclose the same or similar elements as the present round hay bale despooler device, nor do they present the material components in a manner contemplated or anticipated in the prior art.

In a search of prior art, several round bale carriers and unrolling devices were found which are distinguishable from the present device. In U.S. Pat. No. 4,518,299 to Vanderlei, a transport cart carries a round bale laterally and provides a hydraulic or cable drive lowering method to lower the bale onto spikes which peel the hay from the round bale as it is lowered. This device is pulled directly behind a vehicle and uses outer tires to roll the device and a pair of lateral spikes directed into the bale for carriage. Other patents using hydraulic or mechanical lifts on the front of a tractor or other vehicle, including U.S. Pat. No. 4,514,127 to Maier, U.S. Pat. No. 4,886,409 to Penner, and U.S. Pat. No. 5,067,870 to Staffanson. In U.S. Pat. No. 3,997,069 to McCanse, a three-point hitch mounted hydraulic arm lifts a round bale and lowers it to the ground for unrolling the bale. A rear vehicle mounting device which picks up and lowers a round bale behind a vehicle is shown in U.S. Pat. No. 4,538,948 to Melton, U.S. Pat. No. 4,044,963 to Hostetler and U.S. Pat. No. 5,316,427 to DeLong, all of which lit a round bale above the rear of the vehicle and lower it for unrolling the bale directly behind the vehicle.

None of the noted prior art disclose a round bale transport system having a single angular hay spike which allows for engagement of a round bale by the spike engaging the bale by a right turn, disengaging the round bale by a left turn, or providing the hay bale transport laterally and away from the towing vehicle. They do not include the same elements working together to perform the same function, nor do they demonstrate any handling of inflamed and burning round hay bales to unroll the hay for extinguishment.

II. SUMMARY OF THE INVENTION

During grass fires, especially in rural areas, firefighters struggle to extinguish hay bales. The current technique for firefighters is to hand rake each layer off the bale to apply water to the hay, inside and out. Simply extinguishing the outer later does not address the smoldering core of the hay bale, which is subject to reignite. A whole bale can require up to 200 gallons of water and still not extinguish the fire. Hand raking the bale to remove the hay exposes the firefighters to injury and consuming time. It often takes nearly an hour for a single bale to be unrolled using this hand raking to extinguish the bale and eliminate burning. Most grass fires involve several bales, and taking an hour a bale on an entire field of burning bales would take days or an enormous number of personnel. Firefighters cannot get close to the burning bales without exposure to intense and dangerous heat when they are engulfed in flames.

Therefore, a device which can engage and disengage a bale, roll it out and prevent firefighter from having to individually approach each bale for manual intervention is an improvement over any prior art. The present device reduces injury to firefighters, provides for a more expedient and efficient means of unrolling an inflamed hay bale, and does not expose the vehicle to which the device is attached to exposure to the flames or burning embers of the inflamed hay bale or risk of damage from direct frontal or rear carriage of the flaming hay bale. It takes less than 5 minutes per bale to unroll and extinguish, saving 92% of the time it takes to completely extinguish a burning hay bale. The device saves lives, health of firefighters, damage to property and further combustion of adjoining grass, trees and hay.

III. DESCRIPTION OF THE DRAWINGS

The following drawings are submitted with this utility patent application.

IV. DESCRIPTION OF THE PREFERRED EMBODIMENT

Figure 1:
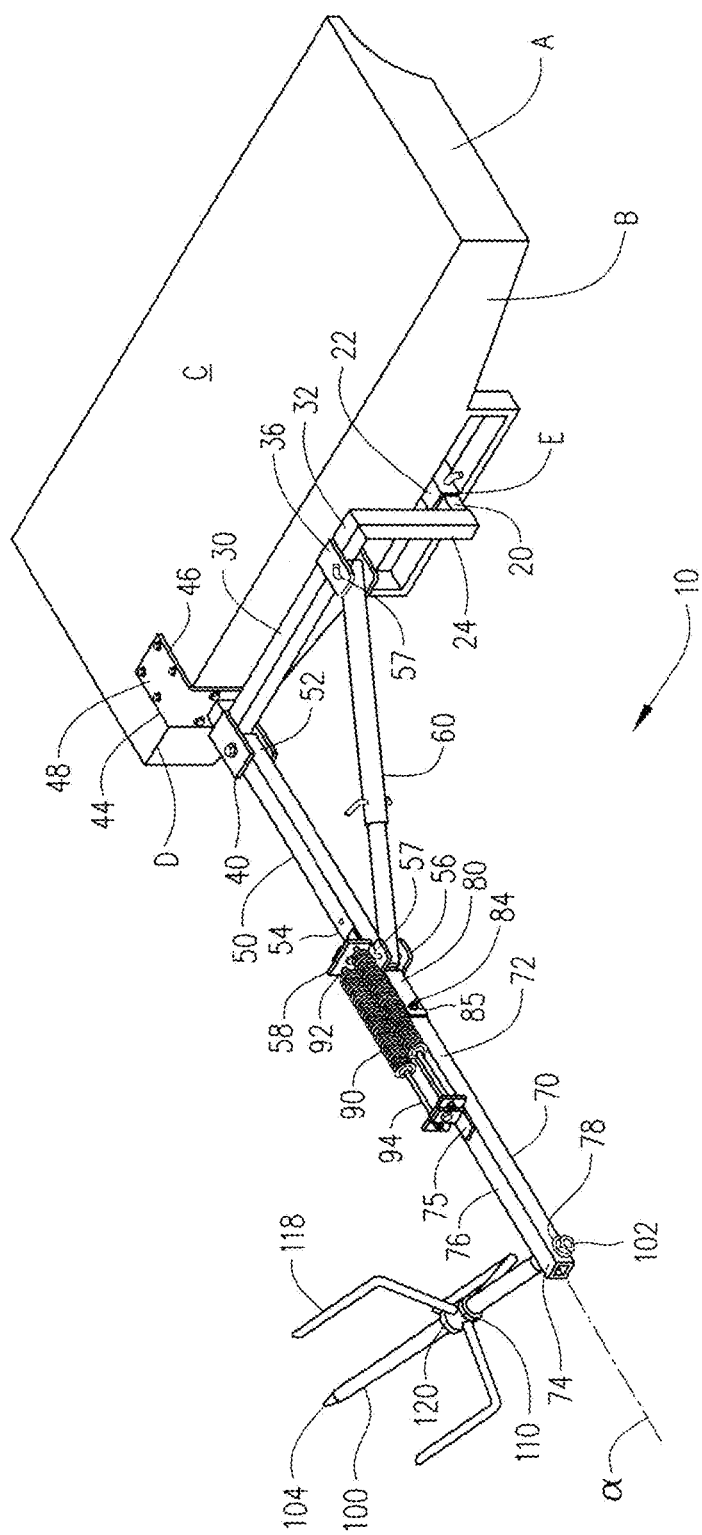
FIG. 1 is an upper perspective view of the firefighter hay bale despooler attached to the rear of a vehicle and supported by a flatbed of the vehicle.
Figure 2:
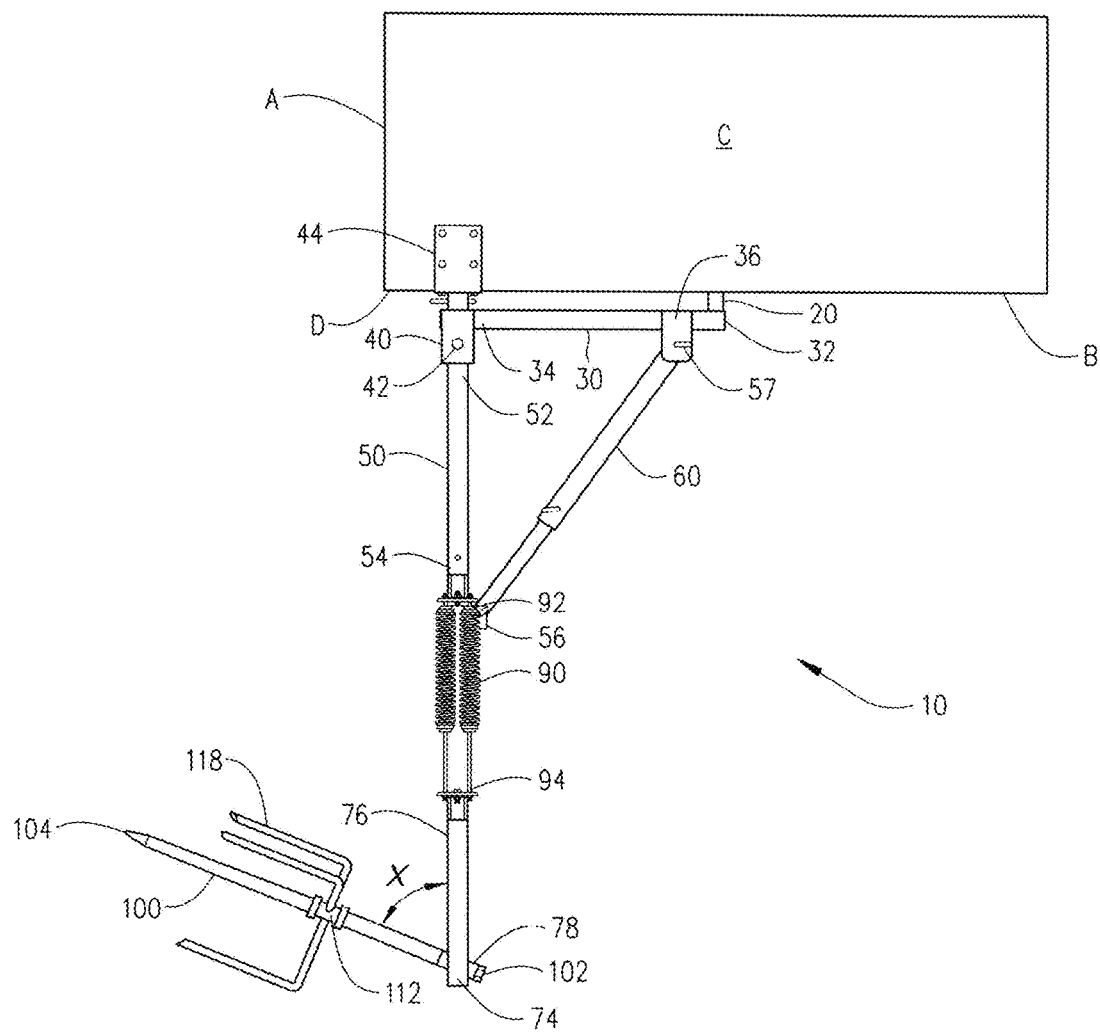
FIG. 2 is a top view of FIG. 1.
Figure 3:
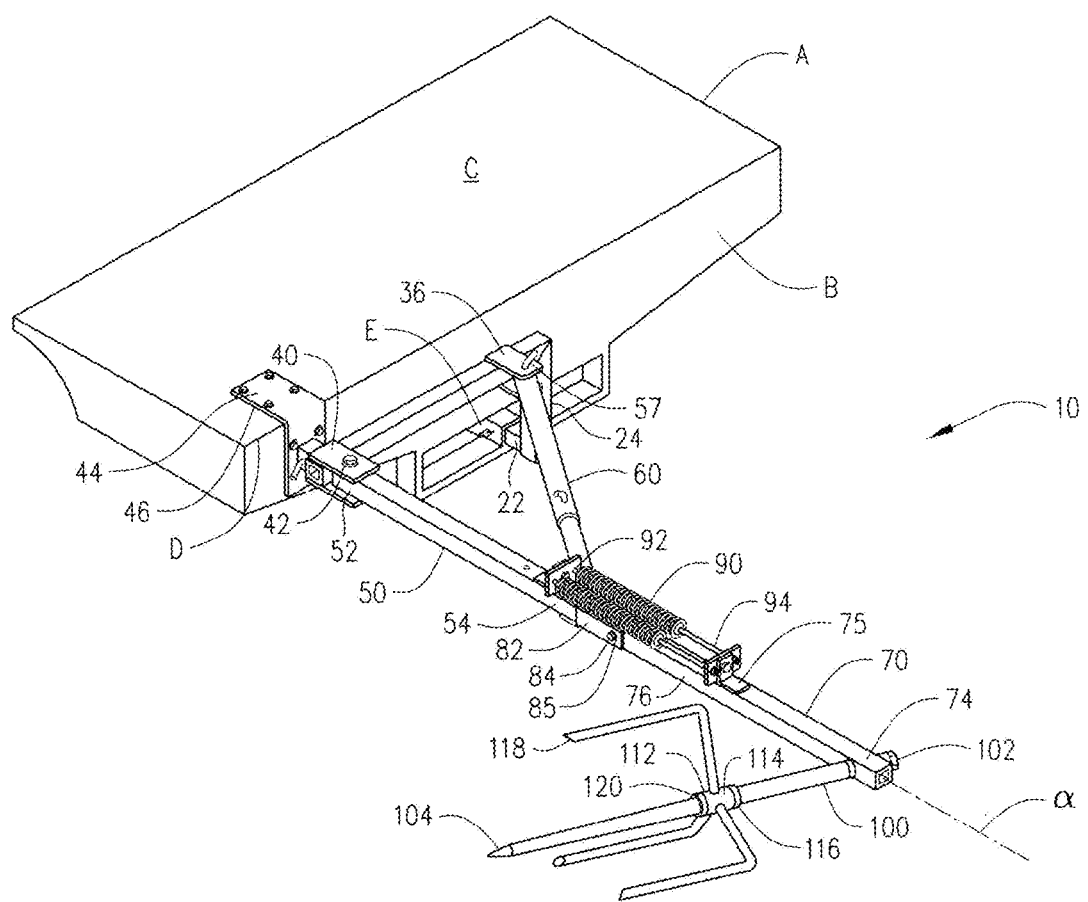
FIG. 3 is a lateral perspective view of the firefighter hay bale despooler attached to the rear of the vehicle and supported by the flatbed of the vehicle.

A hay bale unrolling device 10, as shown in FIGS. 1-3 of the drawings, is utilized by firefighter to engage and disengage an inflamed round bale during a grass or pasture fire and despool the round bale for extinguishment to reduce the risk of harm to the firefighters and firefighter brush pump vehicles A. The purpose of the hay bale unrolling device 10 is to engage the round bale, unroll the hay comprising the round bale into a flat layer of hay and to disengage the round bale without exposing the firefighters to the flaming hay bale. Once the hay bale is unrolled, a more efficient application of water can be applied and the hay bale is more thoroughly extinguished to prohibit reigniting of the round bale with less water required to extinguish the burning hay.

The disclosed hay bale unrolling device 10 is disclosed for left side engagement (driver's perspective) although it is contemplated that the components may be adjusted for right side engagement. The left side engagement is preferred over the right side engagement because the hay bale is going to be unrolled on the left rear side of the vehicle, which orients the hay during the unrolling process in the left side rear view mirror which would be the driver's side of the vehicle. This left side presentation makes it easier to engage and disengage the hay bale and to observe an flaming hay bale in the event emergency disengagement is required.

The hay bale unrolling device 10 comprises a square hitch insert 20 engaging a square hitch receiver E below a flatbed C on the rear B of a firefighting vehicle A, the square hitch insert 20 defining a projecting end 22 attached to an upright base support member 24 which attaches to a first end 32 of a lateral support arm 30 extending to a left lateral second end 34. Attaching to the second end 34 is a pivotal base frame 40 and an angular flatbed support plate 44 defining an inner angular surface 46 in contact with a rear edge D of the flatbed C on the left side of the flatbed C and an outer surface 48 to which the pivotal base frame 40 is mounted, the pivotal base frame 40 directed away from the flatbed C. The angular support plate 44 may also include a locking means to secure this angular support plate 44 to the flatbed C, although not shown.

A first end 52 of a first rear support member 50 is pivotally attached within the pivotal base frame 40 by a pin or bolt 42 to unfold the first rear support member 50 from a flat profile against the lateral support arm 30 to a ninety degree extended angle. This ninety degree extension places the first rear support member 50 perpendicular to the rear edge D of the flatbed C, as shown in FIGS. 1-3. To support and stabilize the ninety degree position, an extendable support strut 60 is attached between a support strut plate 36 on the lateral support arm 30 at the first end 32 and a support strut plate 56 on a second end 54 of the first rear support member 50. Connection of the extendable support strut 60 to its respective support member plates 36, 56, is preferably by a pin 57 for ease of attachment and detachment. The pivotal base frame 40 and the extendable support strut 60 provide a folding engagement between the first rear support member 50 and the lateral support arm 30 during attachment of the device 10 to the vehicle A and then unfolded for use.

A first end 72 of a second rear support member 70 pivotally attaches to the second end 54 of the first rear support member 50 by a downward hinge 80. This hinge 80 is provided by a hinge plate 82 statically attached to the second end 54 of the first rear support member 50 with a lateral hinge bore 84 connecting the first end 72 of the second rear support member 70 by a pin or bolt 85, FIGS. 1 and 3. An upper spring 90 is mounted above the hinge plate 82 across the first end 72 of the second rear support member 70 and the second end 54 of the first rear support member 50. This upper spring 90 urges the second rear support member 70 upward, but allows a weighted lowering of the second rear support member 70 upon engagement and the unrolling process of the round bale as further indicated below. The upper spring 90, which may be provided as a strong single spring or more than one strong spring, defines a first end 92 attached to a spring plate 58 above and behind the second end 54 of the first rear support member 50 and a second end 94 attached to another spring plate 75 extending above and away from the first end 72 of the second rear support member 70 as shown in FIGS. 1 and 3. The second support member 70 further defines a second end 74 providing an angular bore 78 of 67.5 degrees directed inwards from an outer margin 76 of the second rear support member 70, measured from a linear axis a of the second rear support member 70.

A base end 102 of a single hay spike 100 is inserted through and attached to the angular bore 78 in the second rear support member 70, with a pointed end 104 directed outward and forward at the same 67.5 degree angle X as provided by the angular bore 78 within the second rear support member 70, as indicated in FIG. 2. This 67.5 degree angle X is not arbitrary, but rather critical. In field testing, angles between 45-90 degrees were tested. It was found that a 45 degree angle would stab a hay bale efficiently, but that angle would not allow the bale to be unrolled because it was too sharp. A 90 degree angle allowed the bale to roll on the spike, by the spike would not engage the bale and tended to allow the bale to roll off the spike. After several variable unit angles of testing were performed, the 67.5 degree angle was found to allow for the spike 100 to penetrate the bale and allow it to unroll efficiently and effectively.

As an option and to further provide more contact engagement with the round hay bale to be engaged upon the hay spike 100, a secondary trident 110 is rotatably attached upon and secured to the single hay spike 100 between the pointed end 104 and the base end 102, as indicated in FIGS. 1-3. This secondary trident 110 defines a hub 112 with a sleeve 114 having a central spike aperture 116 and two or more extending right angled trident spikes 118, FIGS. 1-3 showing an embodiment having three trident spikes 118. The attachment and rotation of the secondary trident 110 may be performed by use of one or more bearings, not shown. Alternatively, the simple installment of a locking collar 120 in front of and behind the hub 112 attaching to the single hay spike 100 would suffice, as shown in FIGS. 1-3.

Engagement of the hay spike 100 within the center of the round bale is required, in order for the hay bale unrolling device to operate as intended in unrolling a hay bale, especially those that are on fire for firefighters to complete the extinguishment the burning hay. This is performed by installing the device 10 on the rear B of the flatbed vehicle A is indicated above, deploying the first rear support member 50 at a ninety degree angle from the lateral support arm 30 and fixing the extendable support strut 60 to hold the ninety degree angle. The pointed end 104 of the hay spike 100 is directed towards the center of the round bale from the outer margin 76 of the second rear support member 70 by turning right, forcing the pointed end 104 of the hay spike 100 into the round bale. Once the hay bale is speared by the pointed end 104, forward movement forces the hay bale further upon the hay spike 100 and onto the secondary trident 110. Further forward movement causes the hay bale to unroll as the vehicle moves forward provided the hay bale is rolling forward in a direction to unroll the hay bale. The operator of the vehicle A should confirm the proper engagement of the proper side of the hay bale to ensure that forward movement of the hay bale unrolls the layer of hay from the hay bale instead of simply rolling the hay bale. If this mistaken engagement of the hay bale occurs, disengagement of the hay bale would be required, but simply performed by turning left to disengage the hay bale and remove it from the hay spike 100 and then reengaging the correct side of the round bale.

Upon completion of the unrolling of the hay bale, the same left turn will remove the hay spike 100 from any remaining spooled hay. Once the hay is exposed to a flat layer, the water applied will efficiently extinguish any flame which is present in the hay. For use in firefighting, it is essential that all components of the device are made of heat resistant metal to withstand the heat during use with inflamed hay bales.

Testing has been conducted to determine the most efficient and effective angle of the hay spike 100 extending from the secondary rear support arm 70, as noted above. It was also determined that inclusion of the hinge plate 82 and the upper spring 90 allowed the second rear support member 70 to bend downward under the weight of the hay bale lowering the hay bale to maintain ground contact as the bale gets smaller while it is being despooled. Both of these elements are essential for proper operation of the device for its intended purpose.

The device 10 may also be useful to a rancher not only for possible fire prevention, but also for feeding livestock using round bales. It would be easier for the rancher to observe the unrolling of the hay bale off to the left rear of the vehicle than it would be directly behind, to ensure unrolling as opposed to dragging the bale. The device 10 works just as well to unroll normal round bale feed hay as it does for unrolling round hay bales on fire. It would simply be a convenience implement instead of an essential firefighting tool. While the hay bale unrolling device 10 has been particularly shown and described with reference to a preferred embodiment thereof, it will be understood by those skilled in the art that changes in form and detail may be made therein without departing from the spirit and scope of the invention.

What is claimed is:

1. A hay bale unrolling device attaching to the rear of a firefighting vehicle, utilized to engage and disengage a round bale on fire during a grass or pasture fire and unroll said round bale reducing exposure and risk of harm to the firefighters and firefighting vehicles, said hay bale unrolling device comprising:
    a square hitch insert engaging a square hitch receiver on said rear of said firefighting vehicle, said square hitch insert defining a projecting end extending an upright base support member;
    a lateral support arm defining a first end attaching to and extending laterally from said upright base support member, said lateral support arm defining a second end;
    an angular support plate attached to said second end of said lateral support arm for lateral support of said lateral support arm, said angular support plate defining an inner surface and an outer surface, said inner surface conforming to a rear edge of a flatbed of said firefighting vehicle, said outer surface attaching a pivotal base frame;
    a first rear support member defining a first end pivotally attaching to said pivotal base frame by a pin allowing said first rear support member to pivot up to a 90 degree angle from said lateral support arm, said first rear support member further defining a second end attaching to a hinge defining a hinge plate with a downward presentation and a lateral hinge bore;
    an extendable support strut connecting by a pin to a strut support plate on said first end of said lateral support arm and further connecting by a pin to a strut support plate on said second end of said first rear support member to stabilize said 90 degree angle between said lateral support arm and said first rear support member;
    a second rear support member defining a first end pivotally attached to said hinge plate by a pin through said lateral hinge bore, said second rear support member further defining a second end having a lateral angular bore;
    at least one upper spring having a first end attaching to a spring plate above said second end of said first rear support member and a second end attaching to a spring plate above said first end of said second rear support member spanning said hinge plate, said at least one spring urging said first and second rear support members in straight alignment, but allowing said second rear support member to be bent downward with applied force; and
    a single hay spike defining a base end secured within said lateral angular bore extending a pointed end laterally away from an outer margin of said second rear support member at a forward angle, wherein said pointed end of said single hay spike is directed towards a center of said round hay bale and said vehicle moves forward to unroll the round hay bale and wherein said second end is lowered against the force of said at least one spring as said hay bale is unrolled to maintain ground contact of said hay bale during unrolling.

2. The hay bale unrolling device of claim 1, wherein:
said device is made entirely of heat resistant metal; and
said forward angle between said single hay spike and said outer margin of said second rear support member as well as said angle angular bore within said second support member is 67.5 degrees measured between a linear axis of said second rear support member and said single hay spike, wherein said round hay bale is engaged during the execution of a right turn of said vehicle to direct said pointed end of said single hay spike into a center of said bale, said vehicle driven forward to unroll said round hay bale and said vehicle disengaging said round hay bale at any time by a left turn of said vehicle to withdraw said single hay spike from said round hay bale.

3. The hay bale unrolling device of claim 1, wherein:
said single hay spike further includes a secondary trident attached between said pointed end and said base end, said secondary trident defining a hub forming a sleeve with a central spike aperture engaging said single spike, said hub further extending at least two angled trident spikes for further secure said round bale upon said single hay spike, said hub held upon said single hay spike by a pair of locking collars.

4. The hay bale unrolling device of claim 1, wherein:
said device is made entirely of heat resistant metal;
said single hay spike further includes a secondary trident attached between said pointed end and said base end, said secondary trident defining a hub forming a sleeve with a central spike aperture engaging said single spike, said hub further extending at least two angled trident spikes for further secure said round bale upon said single hay spike, said hub held upon said single hay spike by a pair of locking collars; and
said forward angle between said single hay spike and said outer margin of said second rear support member as well as said angle angular bore within said second support member is 67.5 degrees measured between a linear axis of said second rear support member and said single hay spike, wherein said round hay bale is engaged during the execution of a right turn of said vehicle to direct said pointed end of said single hay spike into a center of said bale, said vehicle driven forward to unroll said round hay bale and said vehicle disengaging said round hay bale at any time by a left turn of said vehicle to withdraw said single hay spike from said round hay bale.

\* \* \* \* \*